UNITED STATES PATENT OFFICE 2,529,461

EMULSIONS

Herman J. Schneiderwirth, Jenkintown, Pa., assignor to Sharp & Dohme, Incorporated, Philadelphia, Pa., a corporation of Maryland No Drawing. Application April 30, 1949,
Serial No. 90,785

5 Claims. (Cl. 252—310)

This invention relates to the preparation of thixotropic emulsions whereby there is stably, suspendably dispersed throughout a thixotropic gel a water immiscible substance, such as an oil, a fat, a resin or a resin-like material, to form a thixotropic emulsion, and to the resulting novel thixotropic emulsions. These emulsions are called thixotropic since on standing they have a rigid consistency and after shaking or stirring are converted to a fluid which is readily pourable in the form of a liquid, stable, homogeneous emulsion. The transformation from the rigid form to the liquid form is reversible and can be carried on from one form to the other without limit.

The thixotropic emulsions of this invention have a wide field of application and are useful in a number of industrial arts as in colors, pigment and paints, paper and paper coating, cosmetics, food, rubber, leather finishing, and many others.

They are also particularly useful in the pharmaceutical industry in compounding various types of pharmaceutical and therapeutic preparations. Accordingly, the invention especially includes thixotropic emulsions in which the required ingredients for contributing the thixotropic characteristics are in and of themselves useful in therapy, for example, to supply necessary metabolic mineral factors, for example, calcium, iron, magnesium, phosphorus and the like, so that these gels may be thus useful either alone or together with other pharmaceutical or medicinal agents as added ingredients in the thixotropic gel system.

The thixotropic emulsions of the invention may be considered as consisting of at least two phases. One phase is an aqueous dispersion of a water-insoluble, alkaline earth metal salt (this phase hereinafter being referred to as the water-insoluble, alkaline earth mineral salt cake or merely as the mineral salt cake). The second phase comprises at least one water-immiscible or water-insoluble substance such as an oil, a fat, a resin or a resin-like material. These two phases are combined and converted into a thixotropic emulsion by the addition of a citrate or by the addition of citric acid and an alkaline reacting substance which is capable of forming a water-soluble salt with citric acid.

The aqueous phase, the water-immiscible or water-insoluble phase, and the citrate are the three essential ingredients of the thixotropic emulsion. It is to be understood, of course, that a wide variety of other ingredients may be added to the thixotropic emulsions of the invention. Some of these other ingredients are added to the thixotropic emulsion to extend the pH range in which thixotropy can be manifested. These substances are referred to below as thixotropy pH range extenders. Other substances may be added either to decrease the time required for the thixotropic emulsion to be converted from the free flowing sol state to the rigid gel state or to increase the conversion time from the sol to the rigid gel state. Still other substances may be added either to solubilize the fat, or resin or to emulsify the oil or fat used in preparing the thixotropic emulsion, or to increase the concentration of water-insoluble substances in the aqueous phase and so decrease the conversion time of the thixotropic emulsion. Also, some substances, such as medicines or pharmaceuticals, may be added to the thixotropic emulsions of the invention to prepare compositions containing these ingredients in higher concentrations than could be obtained by previously known methods, and to maintain these medicines and pharmaceuticals in a more stable condition over a longer period of time than prior art compositions containing them.

The various ingredients which may be added, as well as the functions performed by them in the thixotropic emulsions, will be described more fully in the following discussion of the essential ingredients of the thixotropic emulsion.

The aqueous phase of the thixotropic emulsion contains as a major constituent, a colloidally dispersible, water-insoluble, alkaline earth metal salt, or a mixture of more than one of such salts, which, for the therapeutic preparations, are those that would be non-toxic in the dosage administered by the selected route. This aqueous dispersion of water-insoluble, alkaline earth metal salts may be prepared, for example, by reacting two separate solutions of water-soluble salts. The first of these solutions, referred to as "Solution A," is an aqueous solution of a water-soluble sulphate, phosphate, carbonate, silicate or other compound, such as an aluminate, molybdate, borate, chromate, malate or others so long as the anion of said water-soluble compound forms a water-insoluble salt with the selected alkaline earth metal, or Solution A may consist of an aqueous mixture of salts, the anion or anions of which will react in an aqueous medium with a cation which is an alkaline earth metal to precipitate the corresponding water-insoluble alkaline earth metal salt.

The second of the necessary solutions, referred to as "Solution B," for use in the preparation of the major constituent of the gel system of the invention is an aqueous solution of a water-soluble, alkaline earth metal salt or mixture of such salts, the anion, or anions of which form a water-soluble salt with the cation or cations of the selected salt or salts in the Solution A used in the particular preparation.

Any desired concentration of the respective solutes may be used in each of the solutions A and B, up to a saturated solution. The latter is generally advantageous for practical purposes. In reacting Solution A with Solution B, it is sometimes convenient, although not essential, to use equal volumes of each solution. Accordingly, the concentration of the solute in one of the two solutions should be such that the quantitative concentration of its cations is the stoichiometric equivalent of the concentration of the anions in the other solution.

The reaction between the two solutions, A and B, may be carried out at any convenient temperature, but preferably below the boiling point of the solutions. However, the lower the temperature in general, the smaller is the particle size of the resulting insoluble salt formed and the better is the resulting thixotropic activity. The results improve and are best as the temperature of the mixture is below room temperature and very best when nearer to 0° C.

Either solution may be added to the other, but the particle size of the precipitated insoluble salt is advantageously smaller when solution B is added to solution A. In either event, the advantageously smaller particle size or better colloidal dispersability is obtained irrespective of the order in which the solutions are added to one another when there is used sufficient of solution B to permit a slight excess of the water-soluble alkaline earth metal salt to remain unreacted.

Whichever solution is added to the other, the addition is advantageously carried out with agitation, e. g. shaking or stirring, preferably the latter, which should at least be sufficient to give adequate intimate mixing of the two solutions. When the addition of the one solution to the other is completed, the precipitated water-insoluble, alkaline earth salt is homogeneously and stably dispersed throughout substantially the entire aqueous medium and very little sedimentation occurs on standing.

The second essential step in preparing these salts in a form suitable for use in the preparation of a thixotropic composition is the concentration of the precipitated, water-insoluble, alkaline earth salts, incidentially accompanied by partial removal of the electrolytes formed during the inter-reaction of the solutes of the two solutions A and B. This concentration may be accomplished by convenient means for removal of the aqueous solution of the resulting water-soluble salts from the insoluble precipitate, advantageously by first decanting off any supernatant either with or without initially adding more water to the supernatant. The concentration is carried out (and incidentally the major portion of the soluble electrolytes are removed) by filtration, either suction or press, and with or without washing the filter cake. The electrolytes do not have to be completely removed but only practically sufficient removed as in these concentration steps. If for reasons concerned with the particular composition of the ultimate end product, more complete removal of electrolytes is desired, the press cake may be washed, for example, until a sample of the washings shows only a faint cloudiness upon the addition to it of a solution of silver nitrate when the washings contain chlorides, or only a slight cloudiness upon the addition of barium chloride solution when the filtrate contains dissolved sulfates. When the end product is to be administered parenterally, the filter cake can go without washing for then the retained electrolytes can help the thixotropic emulsions approach isotonicity. If the end product is to be taken orally, further removal of electrolytes may be desirable to avoid too salty taste or interference with absorption of added ingredients.

In many cases the concentration may be done by centrifugation instead of, or in addition to, filtration.

Then, dependent upon the concentration of water-insoluble, alkaline earth metal salts desired in the end product sought, the necessary further amount of water may be removed from the filter cake preferably by hydraulic pressure using suitable bags or other means for retaining the solids. In this way, moist, water-insoluble, alkaline earth metal salt cakes containing up to as much and even more than fifty per cent of total solids have been obtained. The amount of total solids in the thus formed mineral cake may advantageously vary between from about fifteen per cent to about seventy per cent, the remainder, that is, eighty-five per cent to thirty per cent of the cake being water.

It is not always necessary, however, to precipitate the water-insoluble, alkaline earth metal salts from an aqueous solution in order to obtain the desirable size and shape of the particles needed for the formation of the thixotropic emulsion under the experimental conditions described. Particles of a size and shape suitable for the preparation of thixotropic gels and emulsions can also be obtained by mechanical sub-division of the alkaline earth metal salt or the other inorganic salts described above. Very small particle size, often below one micron, can be obtained by micronizing the water-insoluble substance used. However, the shape of the mechanically sub-divided particles, as well as their size, does influence the thixotropic characteristic of the final preparation. Care must therefore be exercised in preparing the aqueous dispersion of water-insoluble, alkaline earth metal salts by mechanical means, since it is not always possible to control the shape and size of the particles in a micronizing process.

Starting with a mineral cake prepared by any of the methods described above, or by any other suitable method for preparing water-insoluble alkaline earth salts of a size and shape capable of being used in the preparation of thixotropic compositions, the thixotropic emulsions of the invention may be prepared by (1) adding the water-immiscible or water-insoluble substance such as an oil, fat, resin or gum, a resin-like substance and the like to the mineral cake containing the water-insoluble alkaline earth metal salt or a mixture of more than one of such salts and then by means of a strong mixer forming a paste which may be an emulsion or an aqueous semi-solid gel. This mass is then converted into a thixotropic emulsion by the addition of the selected citrate. In a modified procedure (2) the mineral cake is first converted to a thixotropic gel by the addition of a citrate of an alkaline-reacting agent either by the formation of the citrate in situ or by its addition as the desired citrate or mixture of citrates. To the thixotropic gel thus formed, there is added one or more of a variety of water-immiscible or water-insoluble substances such as an oil, fat, resin or gum, a resin-like substance, or any other similar water-insoluble or water-immiscible substance, thereby obtaining an emulsion exhibiting thixotropic characteristics. Another method (3) comprises mechanically sub-dividing the crystalline, water-insoluble alkaline earth salts, as by micronizing the salts to the particle size and shape desired and adding to these finely pulverized salts, in any sequence, the water-immiscible or water-insoluble substance and the citrate. It is, of course, to be understood that modifications may be made in any of above methods, and that additional ingredients may be incorporated in the mineral salt cake, or in the water-insoluble substance, or added to the thixotropic emulsion after it has been prepared, so long as these additional ingredients do not deleteriously affect the thixotropic character of the composition. The thixotropic emulsions obtained by any of the above methods are complex mixtures in which the alkaline earth metal salts and the citrate are responsible for the thixotropy exhibited by the final preparation. The dry preparation made by method 3 above may be converted into a thixotropic emulsion by adding water to it.

The amount of water-insoluble, alkaline earth metal salt needed in these complex thixotropic emulsions varies considerably from composition to composition. In some cases the water-insoluble, alkaline earth metal salts represent only one-twentieth of the total weight of the final composition, in other cases quantities up to one-half of the total weight of the thixotropic emulsion may be employed.

In addition to the water-insoluble alkaline earth metal salts, other salts and compounds of finely sub-divided inorganic solids such as water-insoluble salts of aluminum, bismuth, copper, iron, nickel, titanium, zinc, and many others may be added even in considerable quantity without destroying the thixotropic character of the composition, regardless of whether these are added when the mineral cake is prepared, or at any later stage in the preparation of the emulsion. These additional water-insoluble substances are preferably added in powdered form after they have been, for example, micronized to a particle size of about five microns. In some cases, the addition of these inorganic solids improves the thixotropic characteristic of the emulsion by shortening the time required for the thixotropic emulsion to be converted from a free flowing sol to a rigid gel, while, at the same time, increasing the therapeutic effectiveness of the thixotropic emulsion. The effectiveness of these inorganic salts in adjusting the conversion time of the thixotropic emulsions depends, however, upon the shape and also the size of the added finely powdered salt.

The second essential ingredient, the water-immiscible or water-insoluble substance, used in the preparation of the thixotropic emulsions of this invention, may be at least one of a wide variety of water-immiscible or -insoluble oils and fats of vegetable, mineral or animal origin, as well as natural or synthetic resins or resin-like substances. Examples of the suitable oils and fats are the light or heavy mineral oils, lard, wool fat, cod liver oil, olive and castor oils, linseed oil, refined corn oil, and the like, as well as hydrogenated fats of various kinds such as the vegetable shortenings used in baking and cooking. The natural and synthetic resins or resin-like substances are exemplified by the oleo-resins, as benzoin; the gum resins, as myrrh; the synthetic resins as vinylite resins, phenol-formaldehyde resins, urea-formaldehyde resins, and many others.

The amounts of these materials which can be incorporated into the gel may be, in some instances, unusually high, comprising up to about forty per cent of the total weight of the composition. This finding was unexpected because it is known that when a water-immiscible or water-insoluble substance, such as an oil, fat, resin or the like, is added to prior art thixotropic gels, the thixotropy is entirely destroyed, and a simple, usually unstable emulsion is formed, or, alternately, an immiscible mixture results which separates into various phases.

In some cases, it may be desirable to first dissolve the fat, resin, gum or other water-insoluble substance in a suitable non-aqueous solvent, such as an organic solvent which is non-miscible with water, such as cyclic hydrocarbons of the benzene series as benzene, toluene, and the like, or chloroform, carbon tetrachloride, butyl acetate, or essential oils such as oil of eucalyptus, turpentine, wintergreen and the like, or they may be first dissolved in an organic solvent which is miscible with water, such as alcohol, acetone and the like.

It is to be understood, of course, that these non-aqueous liquids may be incorporated into a thixotropic aqueous mineral dispersion merely to add their inherent property, and that they may be added at any time during the preparation of the thixotropic emulsion, thereby producing a composition in which the minerals are dispersed in a mixture of water and non-aqueous dispersing liquids sometimes together with other substances as described below. A detailed description of the method used to prepare these compositions is given in the examples.

When a water-immiscible substance is to be incorporated in the thixotropic composition, it may be advantageous in some instances to use a small quantity of an emulsifying agent in order to prevent the agglomeration of the water-immiscible substance when it is added to the aqueous phase, thereby forming undesirably large globules of the water-immiscible substance in the thixotropic compostion. The emulsifying agents may be added to the water-immiscible substance before the latter is added to the other ingredients, or the emulsifier may be added during any stage of the preparation of the thixotropic compositions, since they do not interfere undesirably with the thixotropic character of the thixotropic emulsions of the invention.

Examples of emulsifying agents which may be used are natural colloids, such as gum acacia, gum tragacanth, lecithin, egg yolk and the like, or synthetic organic chemicals such as ethanol and the propanolamines, alkyl-substituted decanols and -undecanol and the like compounds.

The third of the essential ingredients in the thixotropic emulsions of the invention, which may be added initially to the alkalin earth metal salt, or may be added after the water-immiscible substance is added to the preparation, is a citrate of an alkaline-reacting cationic radical capable of forming a water-soluble salt with citric acid. Such salts are formed with any of the alkali metals or with a nitrogen base, for example, ammonia, ammonia derivatives as the primary, secondary, and tertiary aliphatic amines, alkanol amines, and quaternary ammonium bases, and the like, that are soluble in water. This citrate may be prepared in situ from citric acid and the alkaline-reacting agent necessary to form the indicated citrate, or may be used in the form of the already prepared citrate. It may be used in some compositions at as little of a fraction of one per cent and in others up to infrequently as much as five per cent or more depending on the total solids of the colloidally dispersed alkaline earth metal salts and on the thixotropic characteristics desired in the end product. In general, it may be said that the lower the total solids content of the composition, the less citrate, while the higher the total solids, the more citrate is required to produce the thixotropic characteristics desired in the end product.

The thixotropic characteristic of the compositions, however, is not necessarily dependent solely upon the citrate. If after the thixotropic emulsion is prepared it is found that the thixotropic characteristics of the composition are "weak," that is, the conversion from the fluid to the rigid state takes place only after the composition has been allowed to stand for an extended length of time, such as for several hours or days, the time interval to obtain a rigid gel may be shortened to any desired extent by the addition of a phytate. On the other hand, if the conversion time from the rigid to the fluid state is too short, the conversion time can be increased to any desired extent by the addition of the proper amount of a complex phosphate. These two phenomena are more fully described below.

The liquid or pourable state of the thixotropic gels of the invention can be referred to as the "sol" state and the rigid state of the composition can be referred to as the "gel" state. The extent or degree of the thixotropy or thixotropic behavior of the compositions embraced by the invention can be modified to a point where it is at a minimum, that is where the conversion time between the sol and gel states is only very slight, or to a maximum where the conversion time between these two states is very pronounced. If it is not convenient or desirable to adjust the conversion time by using more or less citrate, as described above, the conversion time may be adjusted, for example, by controlling the concentration of the precipitated, readily dispersible, water-insoluble alkaline earth metal salts employed, since the lower the concentration of these salts the longer the conversion time of the thixotropic composition. The conversion time may also be controlled by adjusting the hydrogen ion concentration. When, for example the hydrogen ion concentration approaches or becomes greater than about 4.5, that is if the composition is more acid than pH 4.5, the conversion time becomes very short. Likewise, as the hydrogen ion concentration becomes less than about pH 9.0 the conversion time becomes very short. If for some purpose, however, a highly acidic or highly basic thixotropic emulsion is needed having a substantially longer conversion time than normally possible under these acidic or basic conditions, a thixotropy pH range extender may be added which will materially increase the conversion time of the composition. While thixotropic emulsions of this invention have been prepared without limitation as to pH, best results are obtained when the pH of the mixture is maintained between about pH 4.5 and about 9.0. The acidity of the composition may be adjusted by adding the required amount of, for example, citric acid, or any other organic or inorganic acid which will not destroy the thixotropic property of the composition. If an alkaline pH is desired, more of the basic ingredients of the thixotropic composition may be added, such as additional carbonates and the like, or other basic materials which are compatible with the thixotropic character of the composition and with the purpose for which the thixotropic emulsion is to be used. When such a thixotropic emulsion is prepared having a more alkaline or acid reaction, a minor portion of a pH range extender which is a water-soluble agent selected from the water-soluble carbohydrates and the aliphatic polyhydroxy alcohols, particularly the hexitols is added to maintain optimum thixotropy over a wider pH range. Any of the carbohydrates whether it be a monosaccharide or a polysaccharide, is suitable so long as it is water-soluble, for example, a monosaccharide such as a pentose, as xylose, ribose, or a hexose as glucose (dextrose), mannose, fructose (levulose), a heptose, as mannoheptose, or a disaccharide as lactose, maltose, sucrose. Of the water-soluble, aliphatic, polyhydric alcohols, especially suitable are those that are water-soluble and have as many hydroxy groups as there are carbon atoms in the aliphatic chain, particularly the hexitols, for example, sorbitol, mannitol, dulcitol.

The quantity of pH range extender needed varies directly with the degree of acidity or alkalinity of the composition, the more acid or the more basic, the more pH range extender needs to be added. The quantity of pH range extender needed is usually between about five to twenty per cent based on the total weight of the composition. It is, of course, possible to add only a minor portion of the selected pH range extender in order to stabilize the thixotropic emulsion. The conversion time of the composition may then be adjusted by any one or more of the other means for controlling the time required for the sol to be converted to the rigid gel.

An advantageous method for adjusting the conversion time of a thixotropic emulsion consists in adding either a phytate or a complex phosphate to the prepared composition. This method is particularly useful when a large quantity of a thixotropic emulsion is being prepared and it is impractical to attempt to control the characteristics of the end product by too precise measurement of the ingredients used. The quantity of phytate or phosphate to be added depends upon the characteristics of the thixotropic emulsion desired.

If it is desired to decrease the conversion time of a thixotropic emulsion so that a shorter time is required for it to change from a freely flowing thixotropic emulsion to a rigid gel, a small amount of a finely divided phytate is added. The quantity of phytate needed for a specific preparation in order to obtain the desired thixotropic characteristic varies from case to case, but is easily determined, by taking small samples from the thixotropic emulsion and adding varying quantities of the selected phytate until the desired conversion time is obtained. The amount of phytate needed seldom exceeds two per cent and generally is below one per cent. Phytin, which is the calcium salt of hexahydroxy cyclohexane hexaphosphoric acid may be advantageously used for this purpose. It is present in abundance in plant and animal organisms, and, of course, is completely non-toxic and harmless when taken by mouth. Salts other than the calcium salt of this compound also produce the same effect on the thixotropic emulsion Such salts include iron or magnesium phytate as well as the various other salts, such as the barium, copper, lead, lithium, manganese, silver, sodium, strontium and the like metal salts of phytic acid.

A thixotropic emulsion which exhibits too short a conversion time between the sol and the rigid gel can also be adjusted so that the conversion from one state to the other will take place at any longer period desired. The compounds used for this purpose are complex alkali metal salts of phosphoric acid, such as a complex alkali metal salt of an ortho-, meta-, or pyrophosphate. As examples of these salts there may be mentioned sodium tetraphosphate, sodium tripolyphosphate, sodium hexametaphosphate, tetrasodium pyrophosphate, sodium tetrametapyrophosphate, and the like. Polymers of metaphosphoric acid may also be used in like manner to increase the conversion time of the thixotropic emulsion.

The quantity of the complex phosphate needed to increase the conversion time of a thixotropic emulsion may be determined in the same manner as described above for the phytate. The amount of complex phosphate required is usually less than one per cent and is seldom as high as about 2 per cent.

These complex phosphates may also be used to adjust the conversion time of a thixotropic emulsion to which, for instance, too much phytin has been added. In like manner, phytin may be added to thixotropic emulsion to which too large a quantity of a complex phosphate was added in order to decrease the conversion time to any desired degree.

The use of phytin or any other metal salt of phytic acid to decrease the conversion time of a thixotropic emulsion, as well as the use of complex alkali metal phosphates to increase the conversion time of a thixotropic composition, has never been known or used before for this purpose, and it is considered a new and important feature of this invention.

For any desired specific purpose, there may be added to the thixotropic emulsions of the invention other ingredients compatible with the maintenance of its thixotropic characteristics. An advantageous feature of the thixotropic emulsion of this invention is the possibility of having these additional ingredients present in a higher concentration than is ordinarily available in compositions heretofore prepared, as well as in a remarkably stable form. Particularly for therapeutic compositions, there can be included, for example, ingredients for the treatment of metabolic deficiencies as any of the available vitamin or vitamin factors whether water-soluble, or oil-soluble, or any of the suitable amino acids, proteins, protein-hydrolysates and the like; or anti-bacterial agents compatible with the system as sulfanilamide and the non-toxic, active, sulfanilamide derivatives, and other sulfonamides; antibiotics, whether water-soluble or not, as penicillin, tyrothricin, streptomycin and the like; hormones; antacid substances other than those already contained in the thixotropic emulsion; biologicals, as bacterial vaccines, toxoids, virus vaccines; and other therapeutic or pharmaceutical ingredients compatible with the thixotropic system. In most cases, the incorporation of unusually high concentrations of these additional pharmaceuticals into the thixotropic emulsion of the invention is accomplished by adsorption of these additional agents on the colloidally dispersed, water-insoluble, alkaline earth metal salt constituent of the system. The thixotropic emulsions of the invention thus permit administration of their individual ingredients in a concentration higher than hitherto known in other types of compositions.

The therapeutic emulsions prepared according to this invention show remarkable stability, contain their various ingredients in unusually high concentrations, and permit increased absorption from the intestinal tract of the medicinal ingredients of the thixotropic emulsion when it is administered by the oral route. These compositions have pharmaceutical elegance in that they have a smooth, even, creamy feel and are strikingly free of the unpleasant sensation of grittiness.

As the number of such thixotropic emulsions which may be prepared by the methods referred to above is unlimited, the invention will be illustrated by, but not restricted to, the following examples, each one of which will represent a particular type or group of such thixotropic emulsions. To facilitate a clearer presentation, only one type of alkaline earth mineral salt cake (described in Example I), is being used throughout in the preparation of the various thixotropic emulsions of Examples II through IX. A substantial number of such mineral salt cakes have been described in U. S. Patent application Serial No. 621,382, filed October 9, 1945, now Patent 2,487,600, of which the present invention is in part a continuation, and to which reference should be made for additional illustrations of suitable mineral cakes.

The following example describes the preparation of a water-insoluble, alkaline earth mineral salt cake:

*Example I.*—334 grams of crystalline calcium chloride, U. S. P., and 17 grams of crystalline magnesium chloride were dissolved in four liters of tap water, filtered, and cooled to 5° C. In another container, 432 grams of crystalline disodium phosphate, U. S. P., and 65 grams of sodium carbonate monohydrate, U. S. P., were dissolved in four liters of hot tap water, filtered and cooled to 20° C. The calcium chloride-magnesium chloride solution was then added to the disodium phosphate-sodium carbonate solution in an even, steady flow, with continuous stirring. The reaction mixture was permitted to stand overnight, after which, a white loosely packed precipitate, consisting of mixed calcium and magnesium phosphates and carbonates, was obtained. The supernatant liquid was decanted, and the precipitated water-insoluble salts were washed with distilled water until a sample of the washing showed only a slight cloudiness upon the addition of silver nitrate solution. The washed precipitate was then removed to a Buchner funnel, and a suction applied long enough to suck out as much of the water as could be practically removed in that way. The filter cake was then placed in a pressure bag and additional water expressed from it in a hydraulic press until the total solids content of the mineral cake was circa twenty-eight per cent.

The following example illustrates the method of preparing a thixotropic emulsion by first converting the mineral cake of Example I into a thixotropic gel, which gel is then converted into a thixotropic emulsion:

*Example II.*—500 grams of the water-insoluble, alkaline earth mineral salt cake prepared in Example I were mixed with 2.5 grams of citric acid powder and triturated in a mortar. 9.0 grams of sodium citrate powder were added and well stirred into the mixture. Addition of the sodium citrate powder converted the mixture into a thixotropic sol which, after a few minutes of rest, became a rigid gel. The latter was reliquefied by stirring and then put through a homogenizer. This thixotropic preparation was then placed in a container equipped with a stirrer. With the stirrer in continuous motion, 150 grams of cod liver oil were added slowly in a thin stream over a period of approximately fifteen minutes. After all of the code liver oil had been added, stirring was continued for an additional fifteen minutes. The thixotropic emulsion thus prepared showed strong thixotropic characteristics and contained thirty per cent of cod liver oil, the latter evenly and finely dispersed throughout the composition. No oil globules were visible to the naked eye although, under magnification, fine oil globules of equal size, evenly dispersed throughout the thixotropic emulsion, could be detected. The conversion time from the liquid sol state to the rigid gel state was approximately fifteen minutes when this thixotropic emulsion was tested in a test tube of one inch diameter.

In place of the cod liver oil used in the above example, other oils such as heavy mineral oil, olive oil, castor oil, and the like, may be used. Examples of such thixotropic emulsions are given in the table below:

tained. 21 grams of sodium citrate powder U. S. P. were added with stirring to this paste and dissolved therein. An easily flowing, thixotropic emulsion was formed having a conversion time from the free-flowing sol to the rigid gel of approximately one hour when tested in a test tube one inch in diameter.

The above example illustrates that 150 grams of an alkaline earth mineral cake containing twenty-eight per cent total solids prepared as described in Example I can be combined with approximately 500 grams of various other ingredients and that this complex mixture can be converted into a thixotropic emulsion.

The following example illustrates the preparation of a thixotropic emulsion containing a resin and an organic solvent:

*Example IV.*—200 grams of the mineral cake prepared by the method of Example I were mixed with 1.0 gram of citric acid powder and stirred to a paste while warming on a water bath to 55° C. A resin solution (obtained by adding 20 grams of vinylite resin to 50 cc. of toluene and 20 cc. of oil of eucalyptus and heating the mixture on a water bath until the resin completely dissolved) was slowly added to the paste with continuous stirring until a homogeneous semi-soft paste re-

*Table A*

| Mineral cake, Grams | Citric acid powder, Grams | Citrate | | Oil | | Conversion time, Minutes |
|---|---|---|---|---|---|---|
| | | Kind | Grams | Kind | Amount, Grams | |
| 1,000 | None | Ammonium | 16 | Castor | 250 | 60 |
| 1,000 | 3.0 | Mono Ethanolamine | 15 | Olive | 200 | 120 |
| 1,000 | 4.5 | Potassium | 19 | Hydrogenated veg. fat | 300 | 40 |
| 1,000 | None | Sodium | 14 | Mineral oil, heavy | 200 | 45 |

The following example illustrates the method of preparing a thixotropic emulsion containing a vegetable fat and various other ingredients by first mixing the latter with the mineral cake and thereafter converting the mixture into a thixotropic emulsion.

*Example III.*—150 grams of the water-insoluble, alkaline earth mineral salt cake of Example I were mixed in a mortar with 350 grams of aqueous aluminum hydroxide cake (Al₂O₃ content nine per cent). 18 grams of aminoacetic acid (glycin), 12 grams of mannitol, 5.0 grams of citric acid powder were then added to the mixture in the mortar and the whole well stirred and triturated until a rather stiff paste was obtained. The paste was then transferred to a suitable container and heated to approximately 65° C. While this mixture was being heated, 120 grams of hydrogenated vegetable fat (also known as vegetable shortening), was melted in a separate container on a water bath at a temperature of approximately 60° C. After the vegetable fat had melted, and the temperature of the paste had reached 65° C., the molten fat was slowly added with stirring to the warm paste. The mass was continuously stirred while it slowly cooled to room temperature when a smooth, white, semi-soft paste was obsulted. The water bath was removed and stirring continued until the mixture cooled to room temperature. 3.5 grams of sodium citrate were then added thereby forming a complex thixotropic emulsion. The latter was twice put through a homogenizer and thereafter even stronger thixotropic characteristics were exhibited by the emulsion. A sample of this homogenized product readily converted from the free flowing liquid state to a rigid gel within less than two minutes when tested in a test tube of one inch diameter. Microscopic examination revealed the resin dispersed in the form of fine globular particles, evenly dispersed throughout the thixotropic emulsion.

A number of similar emulsions were prepared using different resins. Examples of such thixotropic emulsions are given in the following table:

*Table B*

| Mineral cake, Grams | Citric acid powder, Grams | Resin | | Solvent | Citrate | | Conversion time, minutes |
|---|---|---|---|---|---|---|---|
| | | Kind | Grams | | Kind | Grams | |
| 200 | None | Phenolformaldehyde | 25 | Dioxane, 100 cc | Sodium | 5.0 | 25 |
| 200 | 3.0 | Urea formaldehyde | 15 | Pyridine, 50 cc | Ammonium | 4.5 | 10 |

The following example illustrates a thixotropic emulsion containing a resin, a carbohydrate (as a pH range extender), and as an additional water-insoluble substance, colloidally dispersed sulfur.

*Example V.*—Step 1: 50 grams of colloidal sulfur powder were wetted with 40 cc. of distilled water. 10 grams of sorbitol powder and 100 grams of the mineral cake prepared as in Example I were added and the whole was well mixed until a smooth paste was obtained. This paste was then warmed to 55° C.

Step 2: 10 grams of benzoin, U. S. P. were dissolved in 20 cc. of alcohol, U. S. P over a water-bath. After the benzoin went completely into solution, this liquid was added gradually to the paste obtained in step 1. The combined pastes were removed from the water-bath and the whole stirred until the mixture cooled to room temperature. To this emulsified paste, there was added a mixture consisting of 0.6 gram of citric acid powder, 4.5 grams of sodium citrate powder and 10 grams of sorbitol. A thixotropic emulsion of excellent appearance and good thixotropic characteristics was formed having a conversion time from a freely flowing sol into a rigid gel of approximately twenty-eight minutes when tested in a test tube of one inch diameter.

Other thixotropic emulsions prepared by the method of Example V wherein the colloidal sulfur was replaced by another finely sub-divided powder, such as titanium dioxide, bismuth subcarbonate, copper benzoate and the like, were prepared. Examples of such thixotropic emulsions are given in the following table:

*Table C*

| Mineral cake, Grams | Agent replacing sulfur | | pH range extender | | Resin | | Solvent, cc. | Citric acid, Grams |
|---|---|---|---|---|---|---|---|---|
| | Compound | Grams | Compound | Grams | Compound | Grams | | |
| 200 | Zn carbonate | 50 | Lactose | 25 | Myrrh | 30 | Ethanol, 100 | 2.0 |
| 200 | Cu benzoate | 40 | Mannitol | 15 | Damar | 10 | Chloroform, 30 | None |

| Citrates | | Conversion time minutes |
|---|---|---|
| Kind | Grams | |
| Sodium | 5.5 | 10 |
| Ammonium | 6.0 | 5 |

As described above, the thixotropic emulsions of the invention are particularly well adapted to carry a large number of pharmaceutical or medicinal agents. They are particularly useful for the preparation of vitamin compositions, since it is known that vitamins readily deteriorate when they are incorporated in ordinary liquid preparations. When the vitamins are incorporated in a thixotropic emulsion, however, the keeping quality of the vitamins are greatly enhanced, since they are maintained in a state of complete rest, evenly dispersed throughout a rigid gel which may readily be converted to a free flowing sol when it is desired to administer the medicament.

The following example illustrates the preparation of thixotropic emulsions containing vitamins as its therapeutic ingredient:

*Example VI.*—Step 1: 800 grams of the water-insoluble, alkaline earth mineral salt cake prepared in Example I were placed in a suitable mixing kettle and 4 grams of citric acid powder were added thereto with continuous stirring.

Step 2: In a separate container, 200 grams of olive oil were mixed with 1.2 grams of a vitamin concentrate containing 450,000 U. S. P. units of Vitamin A and 90,000 U. S. P. units of Vitamin D in each gram of concentrate. To this mixture there was then added 3.3 grams of alpha-tocopherol (also known as Vitamin E).

The vitamin-oil mixture prepared in step 2 was then slowly added in a thin stream and with continuous stirring to the mineral cake mixture prepared in step 1. After all the vitamin-oil mixture had been added, a white paste was obtained in which the oils were so well dispersed they were invisible to the naked eye. 18 grams of sodium citrate were then added to the paste with constant stirring, thereby converting the entire mixture into a thixotropic emulsion. The thixotropic emulsion thus obtained may be used directly or it may be put through a homogenizer to form an excellent, free flowing sol having a conversion time of approximately twenty minutes when tested in a test tube of 1 inch diameter.

Various other water-immiscible substances may be used in place of the olive oil used in Example VI, such as any of the water-immiscible or water-insoluble oils, fats or resins described above. Likewise instead of using the particular fat soluble vitamins of Example VI, other fat soluble vitamins or other water-soluble or water-insoluble vitamins, such as any of the B complex vitamins, as Thiamine, Riboflavin, Pyridoxine, Calcium Pantothenate, Folic Acid and the like or any other pharmaceutical or medicinal substance compatible with the thixotropic properties of the composition may be incorporated in the thixotropic emulsions of the invention. In preparing these compositions, the vitamin or other pharmceutical product may first be mixed with the water-immiscible substance, either with or without the addition of an emulsifying agent, and then added to the mineral salt cake as described above, or the vitamin or pharmaceutical product may be added separately after the water-immiscible substance has been added to the mineral salt cake. In either event, the subsequent addition of the citrate will produce thixotropy in the same way as described above.

The following example illustrates the use of phytin to decrease the conversion time of a thixotropic emulsion from a freely flowing sol to a rigid gel.

*Example VII.*—600 grams of an aqueous bismuth sub-carbonate and hydroxide gel dispersion (also known as Milk of Bismuth, National Formulary VII) was filtered and compressed until it contained forty per cent of total solids. This bismuth cake was then added to 60 grams of the water-insoluble, alkaline earth metal salt cake prepared as in Example I, and then 1.2 grams of citric acid powder were added forming a semi-soft paste. To this paste, 100 cc. of camphorated opium tincture, U. S. P. were added in a slow, thin stream while the whole was vigorously stirred. (The camphorated opium tincture is prepared by mixing an alcohol-water extract of opium with camphor, oil of anise and benzoic acid.) 3.2 grams of sodium citrate powder were then added to this rather thin pasty mixture, to convert it into a thixotropic emulsion having rather weak thixotropic characteristics. The conversion time from the freely flowing sol to the rigid gel state took over twelve hours when a sample of this thixotropic emulsion was placed in a test tube of one inch diameter. This weak thixotropic emulsion was divided into two equal portions. 0.75 per cent of finely powdered phytin was added with stirring to one of the portions, thereby forming a thixotropic emulsion of distinctly stronger character, having a conversion time of sixty minutes when tested in a test tube of one inch diameter.

The following example illustrates the use of a complex phosphate to increase the conversion time of a thixotropic emulsion:

*Example VIII.*—To the second portion of the weak thixotropic emulsion prepared in Example VI there was added, with stirring, 1.5 per cent of phytin which produced a thixotropic emulsion having a conversion time of approximately thirty minutes. One per cent of sodium hexametaphosphate was intimately dispersed throughout this viscous thixotropic emulsion thereby reconverting it to a thixotropic emulsion having the desired thixotropic characteristics, and a conversion time of ninety minutes when tested in a test tube of one inch diameter.

While the various specific examples describe the use of certain particular water-insoluble, alkaline earth metal salts, certain particular citrates and certain particular fats, resins or oils, in the respective steps in the preparation of the corresponding thixotropic emulsions, any of these various ingredients may be replaced by any other examples of these respective agents as hereinabove described. It is possible, for example, even to employ ferrous or even ferric sulfate as a solute in solution A, when the anions of the solutes in solution B will form a water-insoluble salt with iron. Copper salts may be similarly employed in corresponding fashion.

While the Examples II through VIII have been prepared respectively with certain individual and specific oils, fats and resins, any desired suitable individual or combination of oils, fats and resins may be employed. Likewise any compatible added agent such as an organic solvent, additional water-insoluble ingredients, or a therapeutic agent may be employed by similar incorporation into any thixotropic emulsion prepared according to the invention. While the examples show the incorporation of therapeutically effective ingredients at certain specific stages of the preparation, it is possible to include the particular therapeutic ingredients or other added ingredients at other stages of the preparation.

Some of the thixotropic emulsions of the invention can also be carefully dried under vacuum preferably at a low temperature, for example 30–40° C., or the desired ingredients may be initially, substantially dry and intimately mixed in the dry state. From the dried state the thixotropic composition can be restored by addition of the required amount of water; or from the dried state, the composition may be prepared in the form of pellets or tablets for use in that form.

To prepare such a product by using initially dry ingredients, the water-insoluble, alkaline earth metal salt (or other water-insoluble addition substance which may be used along with these salts as described above) should have a particle size of preferably about five microns. This particle size can advantageously be obtained by modern micronizing processes and equipment. The following example illustrates the preparation of such a dry product.

*Example IX.*—Step 1: 100 grams of calcium phosphate dibasic, average particle size approximately five microns, were added with stirring to a mixture of 15 grams of magnesium phosphate dibasic, 10 grams of calcium carbonate, 10 grams of calcium phytate, 6.6 grams of water-soluble, peptonized, iron manganese (containing 12.5 per cent of iron and 3.5 per cent of manganese), and 15 grams of mannitol, each ingredient having previously been micronized to a particle size of approximately five microns.

Step 2: 0.9 gram of a vitamin A and D concentrate containing 450,000 U. S. P. units of vitamin A and 90,000 units of vitamin D per gram of concentrate were mixed with 0.4 gram of an antioxidant consisting of a mixture of corn oil, lecithin, gallic acid ester and natural tocopherol. To this vitamin-antioxidant mixture there was then added 2 grams of finely powdered gum acacia and the whole triturated in a mortar to form a smooth, substantially dry powder.

The mixture formed in step 2 was then intimately dispersed throughout the mineral salt mixture prepared in step 1, thereby forming a completely dry product. A 10 gram sample of this product was set aside for further testing. This sample will be referred to below as Mixture A. 3.5 grams of sodium citrate were then intimately mixed with the remainder of the dry product. A 10 gram sample of this mixture (referred to below as Mixture B) also was set aside for further testing. The remainder of the powdery mixture was made up in tablet form, which tablets produced a thixotropic composition when dispersed in a suitable quantity of water. 5 grams of Mixture A (half of the sample of the dry product taken before the addition of sodium citrate), and 5 grams of Mixture B (half of the sample taken after the addition of sodium citrate) were each separately thoroughly dispersed in 8 ccs. of distilled water. Each sample was then transferred to a test tube of one-half inch diameter and six inches in length and allowed to stand overnight. The test tube containing Mixture B dispersed in water had converted to a rigid gel, which became a free flowing sol upon shaking the test tube. This sol upon standing readily became a rigid gel again, demonstrating its desirable thixotropic characteristics. The test tube containing Mixture A had no thixotropic characteristics whatsoever, the insoluble ingredients which were originally suspended in the 8 cc. of water were entirely precipitated and a clear supernatant liquid was formed above the precipitate.

The remaining five grams of each of Mixture A and Mixture B were separately suspended in 100 ccs. of distilled water. The sample containing Mixture B remained for the most part dispersed throughout the water with only the coarser particles settling to the bottom of the container. The sample containing Mixture A formed a complete precipitate with a clear supernatant liquid.

The difference exhibited by Mixtures A and B when added to water is of great significance. When, for example, a tablet prepared from Mixture B is administered orally, the ingredients will readily disperse in the gastro-intestinal fluids thereby facilitating the absorption of the fine mineral particles and other therapeutic ingredients from the intestinal tract. A tablet prepared from Mixture A, however, would resist dispersion in the intestinal fluids and would be absorbed only sparingly from the intestines.

While the above examples illustrate dry compositions, which upon the addition of water are converted into thixotropic emulsions containing a vitamin concentrate, it is to be understood that one or more pharmaceutical or medicinal ingredients may be used along with the vitamin concentrate or in place of it to form similar compositions suitable for therapeutic use.

The trixotropic emulsions of the invention are stable and show no effect from exposure to sunlight and darkness and inconsequential effect on changes in temperature above the freezing point and below the boiling point. For example, no syneresis (e. g., separation of clear liquid above the gel upon standing) is ordinarily observed at room temperature and at temperatures above the freezing point, and any syneresis at room temperature is usually of a negligible degree. Some slight syneresis occurs upon heating, for example, to from 37 to 50° C., but usually the clear liquid above the gel does not exceed three per cent of the total original volume of the gel. While the thixotropic emulsion of the invention may be kept below the freezing point for a short time, if such exposure is for several days or more, the trixotropy is often irreversibly destroyed.

This application is a continuation-in-part of my copending application Serial No. 621,382, filed October 9, 1945, now Patent 2,487,600, which application in turn was in part a continuation of the then copending application Serial No. 457,532, now abandoned, filed September 4, 1942.

While the above described invention has been illustrated with respect to certain specific embodiments of it, it is understood modifications, variations and substitutions may be made in them, and that the invention is limited solely by the scope of the appending claims.

I claim:

1. A thixotropic emulsion comprising an aqueous vehicle, at least one water insoluble alkaline earth metal salt of the group consisting of phosphate, carbonate, sulfate and hydroxide, stably suspendably dispersed therein, a water soluble citrate of an alkaline base dissolved in said aqueous vehicle in an amount sufficient but not over 5%, to produce the thixotropic character of the system, said alkaline base being a member of the group consisting of the alkali metal bases and the nitrogen bases, and at least one substance selected from the group consisting of an oil, and a fat, in an amount up to about 40%.

2. A thixotropic emulsion according to claim 1 in which a phytate is also present in an amount sufficient, up to about 2%, to decrease the conversion time from the free flowing state to the rigid gel state of the thixotropic emulsion.

3. A thixotropic emulsion according to claim 1 in which a water soluble phosphate selected from the class consisting of ortho-, meta-, and pyrophosphates and their polymers is present in an amount sufficient, up to about 2%, to increase the conversion time from the free flowing state to the rigid gel state of the thixotropic emulsion.

4. A thixotropic emulsion comprising an aqueous vehicle, at least one water insoluble alkaline earth metal salt of the group consisting of phosphate, carbonate, sulfate and hydroxide, stably suspendably dispersed therein, a water soluble citrate of an alkaline base dissolved in said aqueous vehicle in an amount sufficient but not over 5%, to produce the thixotropic character of the system, said alkaline base being a member of the group consisting of the alkali metal bases and the nitrogen bases, and a vegetable oil in an amount up to about 40%.

5. A thixotropic emulsion comprising an aqueous vehicle, at least one water insoluble alkaline earth metal salt of the group consisting of phosphate, carbonate, sulfate and hydroxide, stably suspendably dispersed therein, a water soluble citrate of an alkaline base dissolved in said aqueous vehicle in an amount sufficient but not over 5%, to produce the thixotropic character of the system, said alkaline base being a member of the group consisting of the alkali metal bases and the nitrogen bases, and an animal oil in an amount up to about 40%.

HERMAN J. SCHNEIDERWIRTH.

REFERENCES CITED

The following references are of record in the file of this patent:

UNITED STATES PATENTS

| Number | Name | Date |
|---|---|---|
| Re. 21,690 | Bond | Jan. 14, 1941 |
| 1,943,584 | Cross | Jan. 16, 1934 |
| 2,169,983 | Walton | Aug. 15, 1939 |
| 2,277,854 | Lecoq | Mar. 31, 1942 |
| 2,359,413 | Freedman | Oct. 3, 1944 |
| 2,381,621 | Schmelkes | Aug. 7, 1945 |
| 2,384,564 | Roseman | Sept. 11, 1945 |
| 2,405,861 | Todd | Aug. 13, 1946 |
| 2,420,308 | Gates | May 13, 1947 |
| 2,441,729 | Steiner | May 18, 1948 |
| 2,487,600 | Schneiderwirth | Nov. 8, 1949 |